United States Patent
Wilkie

(12) 
(10) Patent No.: US 8,158,227 B2
(45) Date of Patent: Apr. 17, 2012

(54) SOLVENT RESISTANT LABELS AND CONTAINERS INCLUDING SAID LABELS

(75) Inventor: Andrew F. Wilkie, Avondale, PA (US)

(73) Assignee: Applied Extrusion Technologies, Inc., Wilmington, DE (US)

( * ) Notice: Subject to any disclaimer, the term of this patent is extended or adjusted under 35 U.S.C. 154(b) by 461 days.

(21) Appl. No.: 11/387,390

(22) Filed: Mar. 23, 2006

(65) Prior Publication Data

US 2006/0228504 A1 Oct. 12, 2006

Related U.S. Application Data

(60) Provisional application No. 60/669,495, filed on Apr. 8, 2005.

(51) Int. Cl.
*B32B 1/02* (2006.01)
*B32B 15/092* (2006.01)
*B32B 7/12* (2006.01)
*B32B 15/04* (2006.01)

(52) U.S. Cl. ...... 428/35.9; 428/35.7; 428/343; 428/354; 428/35.8

(58) Field of Classification Search ............... 428/35.2, 428/35.7, 195.1, 202, 221, 35.8, 35.9, 343, 428/354; 203/81, 101
See application file for complete search history.

(56) References Cited

U.S. PATENT DOCUMENTS

| | | | | |
|---|---|---|---|---|
| 2,036,276 | A * | 4/1936 | Hothersall | 220/674 |
| 4,008,115 | A | 2/1977 | Fairbanks et al. | |
| 4,280,859 | A * | 7/1981 | Thompson | 156/73.5 |
| 4,313,986 | A | 2/1982 | Magnotta | |
| 4,567,681 | A * | 2/1986 | Fumei | 40/310 |
| 5,073,455 | A * | 12/1991 | Nose et al. | 428/411.1 |
| 5,273,798 | A | 12/1993 | Miner | |
| 5,275,853 | A | 1/1994 | Silvis et al. | |
| 5,281,670 | A * | 1/1994 | Lee et al. | 525/207 |
| 5,451,283 | A * | 9/1995 | Josephy et al. | 156/229 |
| 5,834,078 | A | 11/1998 | Cavitt et al. | |
| 6,245,418 | B1 * | 6/2001 | Freedman | 428/220 |
| 6,248,427 | B1 | 6/2001 | Ast | |
| 2004/0058133 | A1 * | 3/2004 | Bilodeau | 428/195.1 |
| 2004/0087008 | A1 * | 5/2004 | Schembri | 435/287.2 |

* cited by examiner

*Primary Examiner* — Rena Dye
*Assistant Examiner* — Erik Kashnikow
(74) *Attorney, Agent, or Firm* — Caesar, Rivise, Bernstein, Cohen & Pokotilow, Ltd.

(57) ABSTRACT

A solvent resistant label for attachment to a container that includes a solvent therein includes at least one, and preferably two solvent resistant outer surface layers that are resistant to the solvent in the container. A combination of the solvent resistant label and container also constitutes part of this invention.

10 Claims, No Drawings

SOLVENT RESISTANT LABELS AND CONTAINERS INCLUDING SAID LABELS

CROSS-REFERENCE TO RELATED APPLICATIONS

This application claims the benefit of provisional Application No. 60/669,495, filed Apr. 8, 2005, which is incorporated herein in its entirety.

FIELD OF INVENTION

This invention relates generally to solvent resistant labels and the combination of containers including said labels. More specifically, this invention relates to solvent resistant labels that are resistant to hydrocarbon-based materials included in product to be dispensed from a container on which said label is to be employed, and also to the combination of said solvent resistant label and container.

BACKGROUND OF THE INVENTION

A variety of products include hydrocarbon-based materials in them e.g., aliphatic hydrocarbons. For example, Raid, which is a trademarked product of SC Johnson, includes an aliphatic hydrocarbon solvent, which is sold by ESSO Imperial Oil of Toronto, Ontario, Canada, under the product designation EXXSOL D95 Solvent.

The use of hydrocarbon-based materials as a component in products to be dispensed from a container has created problems in the labeling of such containers. Specifically, prior art polyolefin-type label structures, such as polypropylene or polyethylene, are susceptible to swelling from contact with aliphatic hydrocarbons, causing the labels to wrinkle, shrink and otherwise distort (e.g., become wavy).

It is extremely difficult to avoid exposing labels to hydrocarbon-based materials, e.g., materials including aliphatic hydrocarbons in them, during the assembly and testing of containers including products with such hydrocarbon-based materials in them. Specifically, after a container is filled with the product to be dispensed, and before applying the label, a dispensing nozzle commonly is inserted into the container. During this insertion operation it is quite common for some of the product, which includes hydrocarbon-based materials therein, to leak onto the outer surface of the container. Even when dried, over time the residual hydrocarbon-based material on the surface can adversely affect the quality of a subsequently applied label. Moreover, before labeling the container it is common practice to direct the container through a water bath to test for leaks. During this process, residual hydrocarbon-based materials on the container surface can contaminate the test water. Moreover, if a leak does exist in the container being tested, the test water is further contaminated by the leaking material. Thus, the test water itself ultimately becomes contaminated with hydrocarbon-based material and that material actually is transferred to the surface of containers being tested therein. Thus, a serious problem has existed in employing plastic labels on containers including hydrocarbon-based materials therein, causing the industry to use more expensive product identification systems, such as lithographic printing of product identification information directly on the outer surface of the product dispensers. In fact, lithographic printing has remained the preferred method of product identification for products containing a hydrocarbon-based material therein.

Based on the present state of the art a need exists for less expensive product labeling systems, and in particular, for solvent resistant labels that are resistant to hydrocarbon-based materials to thereby permit such labels to retain their integrity without distorting (e.g., without wrinkling, shrinking, or delaminating) in the event they come into contact with such hydrocarbon-based materials employed in numerous packaged products. It is to such solvent-resistant labels and the combination of containers including such labels that the present invention relates.

SUMMARY OF THE INVENTION

The above and other objects of this invention are achieved in a solvent resistant label for attachment to a container that includes a product with a hydrocarbon-based material therein, said label including at least one surface layer having an exposed surface and being resistant to the hydrocarbon-based material, said exposed surface being adapted to be positioned in contact with said container and/or as the outermost surface when said label is attached to said container.

Reference throughout this application, including the claims, to a "solvent resistant" label, layer, surface or surface layer means a label, layer, surface or surface layer that is resistant to hydrocarbon-based materials employed in a product to be dispensed, e.g., aliphatic hydrocarbon-based materials.

Most preferably, the surface layer(s) that are resistant to hydrocarbon-based materials comprise(s) a polar barrier polymer although metal oxide surface layers can also be employed in connection with the broadest aspects of this invention. However, metal oxide layers generally are more expensive to employ than the more preferred polar barrier polymers and also are more complicated to apply in an in-line manufacturing operation. When the solvent resistant surface layer is positioned as the outer surface of the label, remote from the surface layer contacting the container, it preferably comprises a polar barrier polymer.

The polar barrier polymers employed in this invention preferably are selected from the group consisting of polyvinyl alcohol (PVOH), semi-crystalline and amorphous polyesters, e.g., semi-crystalline polyethylene terephthalate (PET) and amorphous polyethylene terephthalate glycol (PETG), ethylene-vinyl alcohol copolymer (EVOH), hydroxyl functionalized polyether amines (epoxy), amorphous nylon (AmNy) and semi-crystalline nylon (N6), semi-crystalline aromatic nylon (MXD6), acrylonitrile copolymers, liquid crystal polymers (LCP), homo and copolymer poly (lactic acid) (PLA), polyvinylidene chloride (PVdC), acrylates (e.g. polymethylmethacrylate) and chloro-fluoro polymers (e.g. PCTFE (polychloro-tetrafluoro-ethylene)) and PVF (polyvinyl fluoride) either alone or uniformly blended with nanoparticles to enhance the solvent barrier properties of the layer. Most preferably the nanoparticles are generally thin, elongated, plate-like structures having both a long and short dimension and being uniformly blended with the polar barrier polymer(s). Representative nanoparticles usable in this invention are nanoclay (e.g. montmorillonite) and nanotalc.

Although less preferred, for the reasons stated above, metal oxide surface layers (e.g. aluminum oxides and silicone oxides) are also acceptable solvent resistant layers within the broadest scope of this invention. Although the metal oxides have not yet been tested, applicant has determined that vapor deposited, substantially pure metals, such as aluminum, have solvent resistant properties but are too soft to be employed without a protective layer. It is believed that the metal oxides also will possess desired solvent resistant properties but with greater strength and abrasion resistance than the pure metal.

This should permit use of the metal oxides as one or both solvent resistant layers in accordance with the broadest aspects of this invention.

In accordance with this invention the solvent resistant surface layer also can include a blend of one or more of the above-identified polar barrier polymers and a polyolefin functionalized with maleic anhydride (hereinafter sometimes referred to as a "maleated polyolefin"), e.g., a maleated polypropylene, to make the solvent resistant layer compatible with one more polyolefin layers with which the surface layer may be laminated or coextruded.

Preferably the labels of this invention are multi-component structures. Reference throughout this application to the labels being "multi-component" structures means that the labels are laminates of individual films; each film either may or may not be a multilayer structure. Most preferably each film of the laminate is a multilayer structure having an internal core layer and one or more layers on opposed sides of the core layer.

Preferably the multi-component labels of this invention include at least one solvent resistant surface layer and most preferably both surface layers are solvent resistant.

In a preferred embodiment, multilayer films employed in the multi-component label structure include an interior core employing a polyolefin homopolymer and/or copolymer; most preferably a polypropylene homopolymer and/or polypropylene copolymer. If desired, the polyolefin core can be functionalized with maleic anhydride, which will make the core compatible with a solvent resistant surface layer including a polar barrier polymer either with or without a maleated polyolefin blended therewith.

If neither the interior core or solvent resistant layer(s) are functionalized with maleic anhydride to make them compatible with each other, than a separate tie layer compatible with both the material of the interior core and the solvent resistant layer will need to be employed between these latter-two layers of the multilayer films in the multi-component labels. Preferably, the separate tie layer includes a polyolefin, e.g., polypropylene, functionalized with maleic anhydride.

Individuals skilled in the art clearly understand the need to provide compatibility between layers that are to be secured to each other in the multilayer film(s), such as by laminating or coextruding them together. It is well known that polyolefin functionalized with maleic anhydride is compatible both with layers including similar polyolefins and also with polar polymers of the type that preferably are employed in the solvent resistant surface layer(s) of the labels of this invention.

It should be understood that a wide variety of different multi-component labels are within the scope of this invention. For example, the multi-component labels can include more than two films laminated together. Moreover, one or more of the films of the laminate can be a multilayer structure including 2, 3, 4, 5 and even more layers therein. The important feature in the labels of this invention is that at least one, and preferably both surface layers are solvent resistant surface layers.

In accordance with the broadest aspect of this invention the solvent resistant surface layer(s) of the labels of this invention can be the inner surface layer engaging said container and/or the outermost layer of the label. More preferably the solvent resistant surface layer is at least the inner surface layer engaging the container, and most preferably, both the inner surface layer and the outer surface layer are solvent resistant surface layers.

In accordance with the broadest aspects of this invention the labels can be either clear or opaque. Specifically, one or more of the film layers in the label can be voided with any conventional, well-known voiding agent, e.g., calcium carbonate to render the label opaque. Also, if desired, the label can be a shrink label primarily designed to be shrunk in the circumferential direction of the label on the container, to insure a tight fit of the label on the container. However, the label need not be a shrink label in accordance with the broadest aspects of this invention.

In the preferred construction the label is wrapped about a container with the marginal ends being overlapped and bonded together. However, in accordance with the broadest aspects of this invention, the labels can be of a finite dimension less than the circumference or perimeter of the container, and adhered directly to the container by a suitable adhesive. However, in these latter label constructions there is a possibility that the solvent propellant could attack the adhesive and cause the label to either separate from or fall off of the container.

DETAILED DESCRIPTION OF THE INVENTION

Reference in this application to "polypropylene" unless indicated otherwise, means a crystalline propylene homopolymer or a copolymer of propylene with another a-monoolefin having from 2 to 8 carbon atoms in an amount insufficient to have a significant effect on the crystallinity of the polypropylene. Typically, this is ethylene in an amount of less than 2%, and more preferably less than 1% by the weight of the polymer. Reference in this application to "polypropylene copolymer" unless indicated otherwise, means a copolymer of propylene with another α-monoolefin having from 2-8 carbon atoms in an amount of 2% or greater. Most preferably the polypropylene copolymer is a propylene/ethylene copolymer having an ethylene content of no more than 10% by weight.

Reference in this application to "α-monoolefin" unless indicated otherwise, means a linear unsaturated hydrocarbon monomer having one carbon-carbon double bond, which double bond is located at the end of the linear chain. The term is intended to include any such monomer having 8 carbon atoms or less, including ethylene and propylene.

The term "self-supporting" in reference to a film, label or layer means that the film, label or layer can support itself without the aid of any additional supporting layers to provide the necessary strength and body to permit it to be handled without being adhered to another substrate. Such a film, label or layer may also be referred to as a "stand-alone" label, film or layer, as the case may be.

As stated earlier, reference throughout this application to the labels being "multi-component" structures means that the labels are laminates of individual films; each film either may or may not be a multilayer structure. Most preferably each film of the laminate is a multilayer structure having an internal core layer and one or more layers on opposed sides of the core layer. The labels of this invention may include graphics or other visible indicia to identify the product in a labeled container.

A typical label structure includes one or more films, each employing a core comprising polypropylene, a polypropylene copolymer or blends of such polypropylene and polypropylene copolymer, and one or more additional polymer layers on opposed sides of the core. The label can be either clear or opaque. Most preferably the opaque structure is formed by including any well-known voiding agent, e.g., calcium carbonate in an interior core layer of a multilayer film employed in the label structure and not in a surface layer to be positioned in contact with a surface of the container.

In accordance with a preferred embodiment of this invention, the solvent resistant label is a multi-component polymeric structure including at least one solvent-resistant surface layer, as defined earlier herein. Most preferably the solvent resistant surface layer(s) include(s) a solvent resistant polar barrier polymer. However, although less preferred for reasons stated earlier herein, one or both of the solvent resistant layers can be formed of a metal oxide (e.g., aluminum oxides or silicon oxides). Such a metal oxide is both resistant to hydrocarbon-based materials and also is sufficiently hard to avoid damage by scratching, etc.

Although a variety of polar barrier polymers can be employed, in the most preferred form of this invention the polar barrier polymer is selected from the group consisting of polyvinyl alcohol (PVOH), semi-crystalline and amorphous polyesters, e.g., semi-crystalline polyethylene terephthalate (PET) and amorphous polyethylene terephthalate glycol (PETG), ethylene-vinyl alcohol copolymer (EVOH), hydroxyl functionalized polyether amines (epoxy), amorphous nylon (AmNy) and semi-crystalline nylon (N6), semi-crystalline aromatic nylon (MXD6), acrylonitrile copolymers, liquid crystal polymers (LCP), homo and copolymer poly (lactic acid) (PLA), polyvinylidene chloride (PVdC), acrylates (e.g. polymethylmethacrylate) and chloro-fluoro polymers (e.g. PCTFE (polychloro-tetrafluoro-ethylene)) and PVF (polyvinyl fluoride) either alone or blended with nanoparticles to enhance the solvent barrier properties of the layer. Most preferably the nanoparticles are generally thin, elongated, plate-like structures having both a long and short dimension and uniformly dispersed throughout the polar barrier polymer(s). Representative nanoparticles usable in this invention are nanoclay (e.g. montmorillonite) and nanotalc.

It should be noted that semi-crystalline nylon 6, acrylonitrile copolymers and homo and copolymer poly (lactic acid), acrylates, chloro-fluoro polymers and PVF have not yet been tested, but based on the applicant's knowledge regarding the polar barrier polymers that have been successful applicant considers the latter-identified, untested polymers to be within the broadest scope of this invention.

In the most preferred embodiments of this invention both outer surfaces of the label are provided by a solvent-resistant surface layer. Most preferably, the labels of this invention are wrap-around labels including product identification indicia thereon. These wrap-around labels are wrapped about the outer periphery of a container including the hydrocarbon-based materials therein, and the opposed ends of the label are overlapped and bonded together.

In the preferred label constructions of this invention at least the inner surface of the label contacting the outer surface of the container is a surface of a solvent-resistant layer, to thereby impede or prevent any adverse effects resulting from the hydrocarbon-based material actually being on the outer surface of the container and thereby coming into contact with the innermost layer of the label. However, as stated earlier, it is within the broadest scope of this invention to include a solvent resistant surface layer only as the outer surface layer of the label, although in the most preferred embodiments a solvent resistant surface layer is provided as both the inner and outer layers of a multi-component label structure.

In particular, during handling and/or dispensing of product from the container it is quite common for the dispensed material, which includes the solvent, to actually contact the outer surface of the label. Thus, in the most preferred embodiments of this invention wherein the outer surface layer of the label also is provided by a solvent resistant layer comprising a polar barrier polymer, distortion of the label, e.g., by wrinkling, swelling and/or delaminating, will be greatly minimized, and in many cases eliminated.

The layers included in the multilayer films employed in the labels of this invention must be compatible to permit those layers to be laminated together, coextruded together or formed by coating. In accordance with this invention, the polar polymers usable in the solvent resistant layer can be blended with a maleated polyolefin to render that solvent resistant layer compatible with a polyolefin layer, such as a polyolefin core layer of a multilayer film employed in the label construction. The polyolefin core layer can employ any of the well-known polymers employed in multilayer polyolefin film structures and most preferably the polymers are polypropylene or polypropylene copolymers, as defined above.

If desired the polypropylene or polypropylene copolymers employed in the core layer of a multilayer film employed in a label of this invention can be functionalized with maleic anhydride to thereby make the core layer compatible with the above-identified polar barrier polymers, with or without a maleated polyolefin blended therewith. However, if neither the core layer nor polar barrier polymer of the solvent resistant layer includes a maleated polyolefin in it, then a separate tie layer that is compatible with both the core layer and polar barrier polymer layer needs to be employed between them. Such a tie layer can include a maleated polyolefin, e.g., a polypropylene functionalized with maleic anhydride.

Conventional additives, in conventional amounts, can be included in the multi-component labels of this invention, provided that no additive should be included that can negatively affect the performance of the film layer in which it is included or of the multi-component label structure, e.g., by causing undesired void space or by migrating into another layer and negatively affecting the performance of that layer in carrying out its intended function. Suitable conventional additives include antioxidants, pigments, orientation stress modifiers, flame retardants, antistatic agents, antifoggants, antiblocking agents and slip agents.

The barrier films from which the labels of this invention are formed can be manufactured by a variety of well-known film forming methods including conventional mono and multi-layer extrusion and coextrusion processes, mono or coextrusion coating processes wherein a coating of a polar barrier polymer is extruded onto an extruded monolayer or multi-layer film between the machine direction and cross-machine direction orienting steps, a conventional in-line coating operation wherein the coating of the polar polymer is applied by a conventional coating operation between the machine direction and cross-machine direction orienting steps, or in a conventional out-of-line coating operation. In the above processes, the completed polymeric film employed in the labels of this invention can be biaxially oriented as part of a conventional coextrusion operation wherein all layers of a multilayer film are coextruded and then simultaneously oriented in both the machine direction and cross-machine direction. Alternatively, all of the film layers, except for the polar barrier polymer can be biaxially oriented, resulting from the polar barrier polymer layer being applied to previously extruded layers of the film between the machine direction and cross-machine direction orientation operations, or after the coextruded film has been biaxially oriented. In accordance with the broadest aspects of this invention, the film-extrusion processes can be carried out on any well-known film-extrusion systems, e.g., tenter or tubular.

It should be understood that the thickness of the polar barrier polymer layer required to yield a layer that is solvent-resistant is a function of the type of barrier polymer or polymer blend employed, and can be varied within wide limits. For coatings, the most effective barrier polymers were determined to be polyvinyl alcohol and epoxy. For coextrusion and extrusion coating methods, the most effective barrier polymers were Liquid Crystal Polymer (LCP), polyethylene terephthalate (PET), polyethylene terephthalate glycol (PETG), EVOH, Amorphous Nylon (AmNy), MXD-6 and MXD6 with/nanoclay. In some cases a polar barrier polymer can be blended with a polyolefin and still provide an effective barrier coating. For example, excellent results were observed in a multi-component label employing two multilayer films laminated together and wherein each film was provided with an outer barrier coating layer including a blend of a functionalized polyolefin (e.g., maleated polypropylene) and amorphous nylon in a weight percentage of 60% amorphous nylon and 40% maleated polypropylene. The two films were laminated together such that the outer barrier coating layer of each film constituted an outer layer of the multi-component label. Most preferably when a polar polymer is blended with a maleated polyolefin, the polar polymer should constitute over 50%, by weight, of the polymer blend.

As noted earlier, in the most preferred embodiments of this invention the solvent resistant labels of this invention include solvent resistant surface layers as both outer layers of the structure.

Labels within the scope of this invention are considered to have acceptable barrier properties if they do not fail (e.g., by distorting, wrinkling or delaminating) for at period of time in excess of 55 hours; more preferably in excess of 70 hours; even more preferably in excess of 100 hours and most preferably in excess of 300 hours, when subjected to the following solvent-exposure testing procedure:

Example

Four (4) multi-component label structures were employed, as follows:
1. A laminate of two, coextruded, biaxially oriented polypropylene films bonded together, each film being a three layer structure having a thickness of approximately 115 gauge and including a polypropylene homopolymer core and opposed, skin layers; one being comprised of a propylene/ethylene copolymer and the other being comprised of a polypropylene homopolymer. Neither skin layer includes any barrier polymer therein. The two films were laminated together with an acrylic based pressure sensitive adhesive to provide the control. The above-described film is a commercial product of AET and is identified as MXT base film.
2. A laminate of two, coextruded, biaxially oriented polypropylene films bonded together, each film being a three layer structure including a polypropylene homopolymer core, a corona treated skin layer of high crystallinity polypropylene homopolymer on one side of the core and a flame treated skin layer of a polypropylene homopolymer modified with non-migratory slip and antiblock additives. A barrier coating of a styrenated-acrylic copolymer (Neorez BT-36, manufactured by Neoresins) is applied to the corona treated skin layer of each film between the machine-direction and cross-machine-direction orientation steps and in the completed film (after biaxially orientation) the coating has a thickness of approximately 2 microns. Each of the completed, biaxially oriented films has a thickness of approximately 78 gauge. The flame treated skin layers of the two films are then adhesively bonded together with an acrylic based pressure sensitive adhesive to complete the formation of the laminate to be tested.
3. A laminate of two, coextruded, biaxially oriented polypropylene films bonded together, each film being a three layer structure including a polypropylene homopolymer core, a corona treated skin layer of high crystallinity polypropylene homopolymer on one side of the core and a flame treated skin layer of a polypropylene homopolymer modified with non-migratory slip and antiblock additives. A barrier coating of a blend of two sulfo polyesters (PET) of differing glass transition temperatures (Tg) (85% Eastman Eastek 1200 and 15% Eastman Eastek 1300, now manufactured by Resolution Specialty Materials, Inc. of Houston Tex.) is applied to the corona treated skin layer of each film between the machine-direction and cross-machine-direction orientation steps and in the completed film (after biaxially orientation) the coating has a thickness of approximately 2 microns. Each of the completed, biaxially oriented films has a thickness of approximately 78 gauge. The flame treated skin layers of the two films are then adhesively bonded together with an acrylic based pressure sensitive adhesive to complete the formation of the laminate to be tested.
4. A laminate of two, coextruded, biaxially oriented polypropylene films bonded together, each film being a three layer structure including a polypropylene homopolymer core, a corona treated skin layer of high crystallinity polypropylene homopolymer on one side of the core and a flame treated skin layer of a polypropylene homopolymer modified with non-migratory slip and antiblock additives. A barrier coating of an epoxy resin (e.g., a hydroxyl functionalized polyether amine) (ICI 670 C1376 from the Glidden Division of ICI) is applied to the corona treated skin layer of each film between the machine-direction and cross-machine-direction orientation steps and in the completed film (after biaxially orientation) the coating has a thickness of approximately 2 microns. Each of the completed, biaxially oriented films has a thickness of approximately 78 gauge. The flame treated skin layers of the two films are then adhesively bonded together with an acrylic based pressure sensitive adhesive to complete the formation of the laminate to be tested.

Prior to wrapping the label structures about respective metal containers, the outer surface of the containers were pre-coated with Raid liquid and air-dried. As noted earlier, the Raid product is a trademarked product of SC Johnson and includes an aliphatic hydrocarbon based material therein, which is an ESSO Imperial Oil product identified as D95 Solvent. The D95 product has various uses, including uses as a solvent and diluent.

The label structures then were each wrapped tightly around respective metal containers and each label was secured to itself with a strip of double-sided tape oriented vertical to the container, to thereby simulate a commercially labeled container product. Each container, with the label structure on it, was then placed in a large glass vessel having a volume of one (1) gallon along with an open container including approximate fifty (50) milliliters of liquid Raid, which, as stated above, includes an aliphatic hydrocarbon-based material therein. The glass vessel was then capped to provide an atmosphere saturated with the hydrocarbon to render the hydrocarbon capable of permeating the entire label structure (inside and out) and the label structures were visually observed over an extended period of time. Label failures (e.g., distortion, wrinkling and delaminating) were observed as follows:

| Film/Adhesive/Film Structure | Time to Visual Failure (hours) |
| --- | --- |
| BOPP Coextruded (control) Ex. 1 | 52 |
| Acrylic coated BOPP (1 μ acrylic layer) Ex. 2 | 72 |
| PET coated BOPP (2 μ PET layer) Ex. 3 | 120 |
| Epoxy coated BOPP (2 μ Epoxy layer) Ex. 4 | 344 |

Based on the above-tabulated results, it should be noted that the epoxy coated BOPP film structure yielded 6.6 times the resistance to the aliphatic hydrocarbon containing liquid compared to the control. The PET and acrylic-coated film structures provided 2.3 times and 1.4 times the solvent resistance of the control, respectively.

It should be apparent that applicant has invented unique solvent resistant label structures that are capable of being exposed to a concentrated atmosphere of a hydrocarbon-based material over a substantial period of time without failing.

While this invention has been described in detail with reference to specific examples thereof, it will be apparent to those skilled in the art that various changes and modifications can be made therein without departing from the spirit and scope thereof. For example, the multi-component film structures can include a variety of different films in the construction, both monolayer and multilayer, provided that at least one of the outer surface layers in the label, more preferably at least the surface layer intended to engage the container and most preferably both surface layers, are substantially resistant to hydrocarbon-based materials.

What is claimed is:

1. In combination, a metal container having an outer surface, a material in said container, said material including an aliphatic hydrocarbon solvent therein, and a label including, as separate components, an adhesive securing the label to the outer surface of the container and a solvent resistant surface layer for preventing distortion of said label, said solvent resistant surface layer comprising a one-part, non-adhesive hydroxyl functionalized polyether amine resin resistant to the material in said container, said solvent resistant surface layer being an inner layer including an inner exposed surface, said inner exposed surface facing the outer surface of the container, said label including an outer layer having an outer exposed surface opposed to said inner exposed surface.

2. The combination of claim 1, wherein said label further includes a tie layer between said solvent resistant surface layer and an adjacent polyolefin layer.

3. The combination of claim 1, wherein said solvent resistant surface layer comprises a blend of said hydroxyl functionalized polyether amine and a maleated polyolefin.

4. The combination of claim 1, said at least one solvent resistant surface layer comprising a blend of a maleated polyolefin and said hydroxyl functionalized polyether amine, either alone or blended with nanoparticles.

5. The combination of claim 1, wherein said label is a multilayer film including an interior core layer employing a polyolefin homopolymer or copolymer, the solvent resistant surface layer on one side of said core layer and constituting an exposed surface of said label, and the outer layer on the side of said core layer opposed to said solvent resistant surface layer.

6. The combination of claim 5, wherein said multi-component structure includes a second film, said second film including a solvent resistant surface layer comprising said hydroxyl functionalized polyether amine resistant to the material in said container, said solvent resistant surface layer of said second film providing an exposed surface of the label.

7. The combination of claim 1, wherein said label includes at least two films laminated together, at least one of said films being a multilayer film including an interior core layer employing a polyolefin homopolymer or copolymer and one of said inner or outer layers of said label, at least another of said films including the other of said inner or outer layers of the label, said outer layer comprising a hydroxyl functionalized polyether amine.

8. The combination of claim 1, wherein said label has a length greater than the perimeter or circumference of the container, marginal ends of said label being overlapped and bonded together by said adhesive, said inner exposed surface of the solvent resistant surface layer of the label being in contact with the outer surface of the container.

9. The combination of claim 2, wherein said tie layer is a maleated polypropylene.

10. The combination of claim 1, said solvent resistant surface layer consisting essentially of the hydroxyl functionalized polyether amine resistant to the material in said container.

* * * * *